US011820511B2

(12) United States Patent
Jarvis et al.

(10) Patent No.: US 11,820,511 B2
(45) Date of Patent: Nov. 21, 2023

(54) UNMANNED AERIAL VEHICLE AND ASSOCIATED METHOD FOR REDUCING DRAG DURING FLIGHT OF AN UNMANNED AERIAL VEHICLE

(71) Applicant: The Boeing Company, Chicago, IL (US)

(72) Inventors: Joshua B. Jarvis, St. Charles, MO (US); Edward T. Meadowcroft, Norristown, PA (US); Roger W. Lacy, West Chester, PA (US)

(73) Assignee: The Boeing Company, Arlington, VA (US)

( * ) Notice: Subject to any disclaimer, the term of this patent is extended or adjusted under 35 U.S.C. 154(b) by 410 days.

(21) Appl. No.: 16/871,184

(22) Filed: May 11, 2020

(65) Prior Publication Data

US 2021/0163120 A1 Jun. 3, 2021

Related U.S. Application Data

(60) Provisional application No. 62/942,976, filed on Dec. 3, 2019.

(51) Int. Cl.
*B64C 7/00* (2006.01)
*B64C 39/02* (2023.01)
(Continued)

(52) U.S. Cl.
CPC .............. *B64C 7/00* (2013.01); *B64C 1/0009* (2013.01); *B64C 39/024* (2013.01); *B64U 10/13* (2023.01); *B64U 30/20* (2023.01); *B64U 50/19* (2023.01)

(58) Field of Classification Search
CPC . B64C 1/0009; B64C 7/00; B64C 2001/0045; B64C 39/04; B64C 27/08; B64C 1/06; B64C 1/16; B64C 1/26
See application file for complete search history.

(56) References Cited

U.S. PATENT DOCUMENTS

2016/0257401 A1 9/2016 Buchmueller et al.
2018/0208301 A1\* 7/2018 Ye ......................... B64D 35/00
(Continued)

FOREIGN PATENT DOCUMENTS

| CN | 104 554 726 | 4/2015 |
| CN | 105 818 956 | 8/2016 |
| CN | 207 089 655 | 3/2018 |

OTHER PUBLICATIONS

European Patent Office, Extended European Search Report, App. No. 20208141.0 (dated Apr. 8, 2021).

*Primary Examiner* — Joshua J Michener
*Assistant Examiner* — Arfan Y. Sinaki
(74) *Attorney, Agent, or Firm* — Walters & Wasylyna LLC (57) ABSTRACT

An unmanned aerial vehicle including a frame elongated along a frame axis, the frame has a leading side and an aft side, the frame further includes a left end portion and a right end portion, a first forward rotor assembly connected to the left end portion of the frame, a second forward rotor assembly connected to the right end portion of the frame, the first forward rotor assembly and the second forward rotor assembly being positioned on the leading side of the frame, a compartment connected to the frame, the compartment having a leading side, and a curved leading-edge fairing disposed on the frame, wherein a portion of the curved leading-edge fairing extends to cover the leading side of the compartment, and wherein the curved leading-edge fairing reduces drag during flight in a forward direction to enable a substantially level flight profile.

19 Claims, 10 Drawing Sheets

(51) Int. Cl.
  *B64C 1/00* (2006.01)
  *B64U 10/13* (2023.01)
  *B64U 30/20* (2023.01)
  *B64U 50/19* (2023.01)

(56) References Cited

U.S. PATENT DOCUMENTS

2019/0112047 A1* 4/2019 Bowers ................ B64C 1/0009
2019/0168872 A1 6/2019 Grubb et al.
2020/0324894 A1* 10/2020 Fredericks ................ B64C 7/00
2022/0212790 A1* 7/2022 Liu ........................... B64C 7/00

* cited by examiner

FIG. 12

UNMANNED AERIAL VEHICLE AND ASSOCIATED METHOD FOR REDUCING DRAG DURING FLIGHT OF AN UNMANNED AERIAL VEHICLE

PRIORITY

This application is a non-provisional of U.S. Ser. No. 62/942,976 filed on Dec. 3, 2019.

FIELD

This application relates to unmanned aerial vehicles and, more particularly, to the use of fairings to reduce drag during flight of unmanned aerial vehicles.

BACKGROUND

Unmanned aerial vehicles (UAVs) are increasingly used for performing a variety of functions in civilian, commercial, and military applications. For example, UAVs may be implemented for delivering payloads, performing emergency services such as firefighting management, locating schools of fish, and other functions.

Unmanned aerial vehicles are typically powered by one or more batteries. Therefore, unmanned aerial vehicles remain in service for only a limited amounted of time (i.e., the service duration), as dictated by battery life. Once a battery on an unmanned aerial vehicle is exhausted, the unmanned aerial vehicle must be taken out of service while the exhausted battery is charged or while the exhausted battery is swapped with a charged battery.

Various factors contribute to battery life and, thus, the service duration of an unmanned aerial vehicle. One particular factor is drag. The greater the drag, the more energy is consumed by the unmanned aerial vehicle per a given flight path, and the shorter the service duration.

Accordingly, those skilled in the art continue with research and development efforts in the field of unmanned aerial vehicles.

SUMMARY

Disclosed are various unmanned aerial vehicles.

In one example, the disclosed unmanned aerial vehicle includes a frame elongated along a frame axis, the frame has a leading side and an aft side, the frame further includes a left end portion and a right end portion, a first forward rotor assembly connected to the left end portion of the frame, a second forward rotor assembly connected to the right end portion of the frame, the first forward rotor assembly and the second forward rotor assembly being positioned on the leading side of the frame, a compartment connected to the frame, the compartment having a leading side, and a curved leading-edge fairing disposed on the frame, wherein a portion of the curved leading-edge fairing extends to cover the leading side of the compartment, and wherein the curved leading-edge fairing reduces drag during flight in a forward direction to enable a substantially level flight profile.

In another example, the disclosed unmanned aerial vehicle includes a frame elongated along a frame axis, the frame having a leading side and an aft side, the frame further including a left end portion and a right end portion axially opposed from the left end portion relative to the frame axis, a first forward rotor assembly connected to the left end portion of the frame by way of a first forward boom, a first aft rotor assembly connected to the left end portion of the frame by way of a first aft boom, a first outboard rotor assembly connected to the left end portion of the frame by way of a first outboard boom, the first outboard boom having a leading side and an aft side, a first forward boom fairing positioned over the leading side of the first outboard boom, a second forward rotor assembly connected to the right end portion of the frame by way of a second forward boom, a second aft rotor assembly connected to the right end portion of the frame by way of a second aft boom, a second outboard rotor assembly connected to the right end portion of the frame by way of a second outboard boom, the second outboard boom having a leading side and an aft side, a second forward boom fairing positioned over the leading side of the second outboard boom, a compartment connected to the frame, the compartment having a leading side, and a curved leading-edge fairing disposed on the frame, wherein a portion of the curved leading-edge fairing extends to cover the leading side of the compartment.

Also disclosed are methods for reducing drag during flight of an unmanned aerial vehicle. The unmanned aerial vehicle includes a frame elongated along a frame axis, the frame having a leading side and an aft side, as well as a left end portion and a right end portion, at least two rotor assemblies connected to the left end portion of the frame by way of at least two first booms, and at least two rotor assemblies connected to the right end portion of the frame by way of at least two second booms.

In one example, the disclosed method for reducing drag during flight of such unmanned aerial vehicle includes steps of (1) positioning a curved leading-edge fairing over at least a portion of the leading side of the frame; (2) positioning a first forward boom fairing over a boom of the at least two first booms; and (3) positioning a second forward boom fairing over a boom of the at least two second booms.

Other examples of the disclosed unmanned aerial vehicles and methods for reducing drag during flight of an unmanned aerial vehicle will become apparent from the following detailed description, the accompanying drawings and the appended claims.

DETAILED DESCRIPTION

Disclosed are unmanned aerial vehicles that have been designed and configured for forward flight with a significantly reduced pitch attitude. For example, the disclosed unmanned aerial vehicles may have a pitch angle about the frame axis of less than 13 degrees (e.g., about 10 degrees or less) when traveling in a forward direction at airspeeds up to about 50 knots. As such, the disclosed unmanned aerial vehicles may experience significantly less drag, thereby significantly increasing service duration of the unmanned aerial vehicles.

Referring to FIGS. 1-6, one example of the disclosed unmanned aerial vehicle, generally designated 10, includes a frame 12, a first forward rotor assembly 30, a second forward rotor assembly 40, a first aft rotor assembly 50, a second aft rotor assembly 60, a first outboard rotor assembly 70, a second outboard rotor assembly 80, a compartment 90, a curved leading-edge fairing 100, a first forward boom fairing 120 and a second forward boom fairing 150. The unmanned aerial vehicle 10 may further include a first aft boom fairing 130 and a second aft boom fairing 160. In other words, the unmanned aerial vehicle 10 includes a pair of forward rotor assemblies 30, 40, a pair of aft rotor assemblies 50, 60, a pair of outboard rotor assemblies 70, 80, and a pair of forward boom fairings 120, 150, and a pair of aft boom fairings 130, 160. Various additional components and features may be included in the disclosed unmanned aerial vehicle 10 without departing from the scope of the present disclosure.

Figure 5:
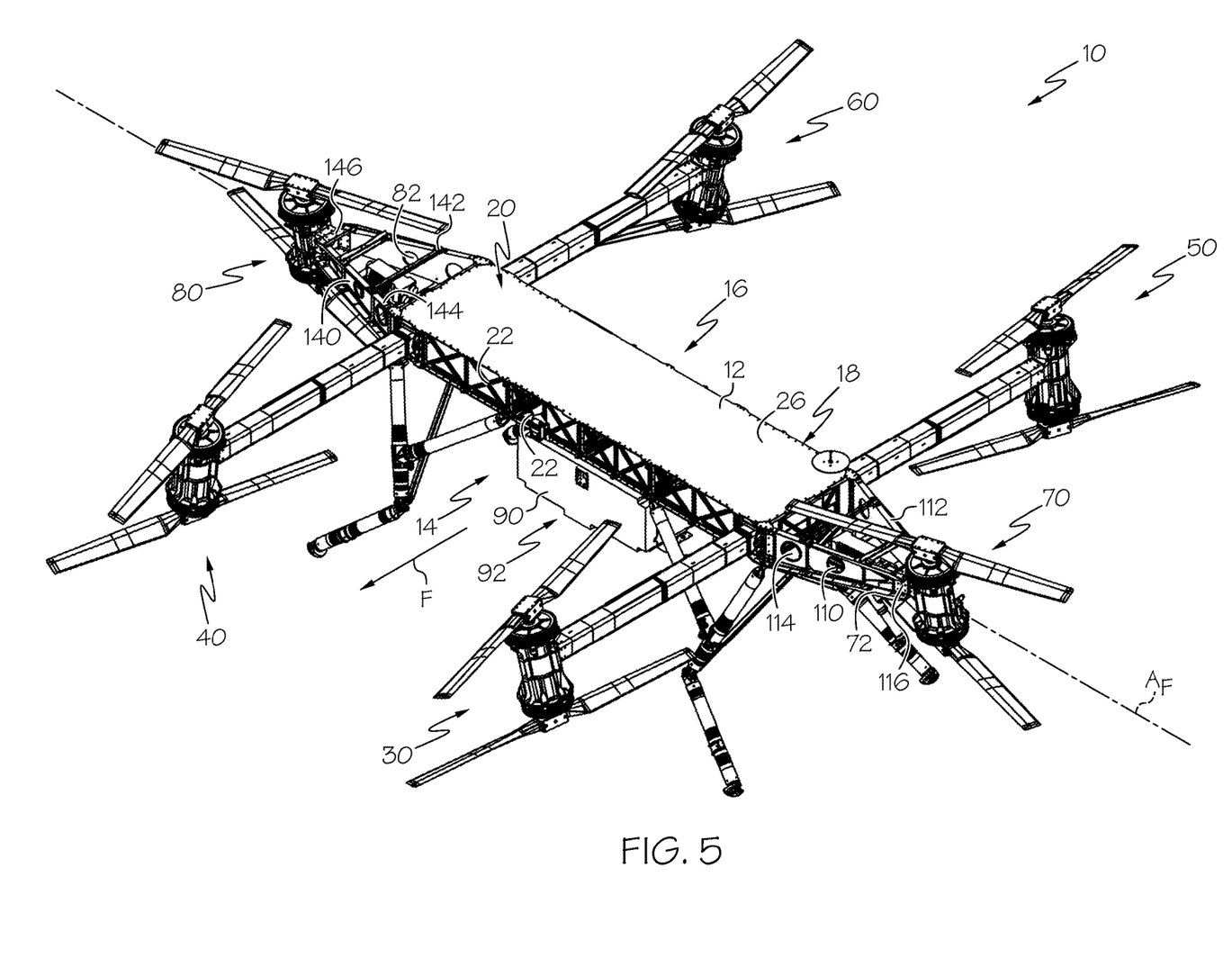
FIG. 5 is a front elevational view of the unmanned aerial vehicle of FIG. 1, but without the curved leading-edge fairing and the boom fairings, thereby showing internal structure.
Figure 6:
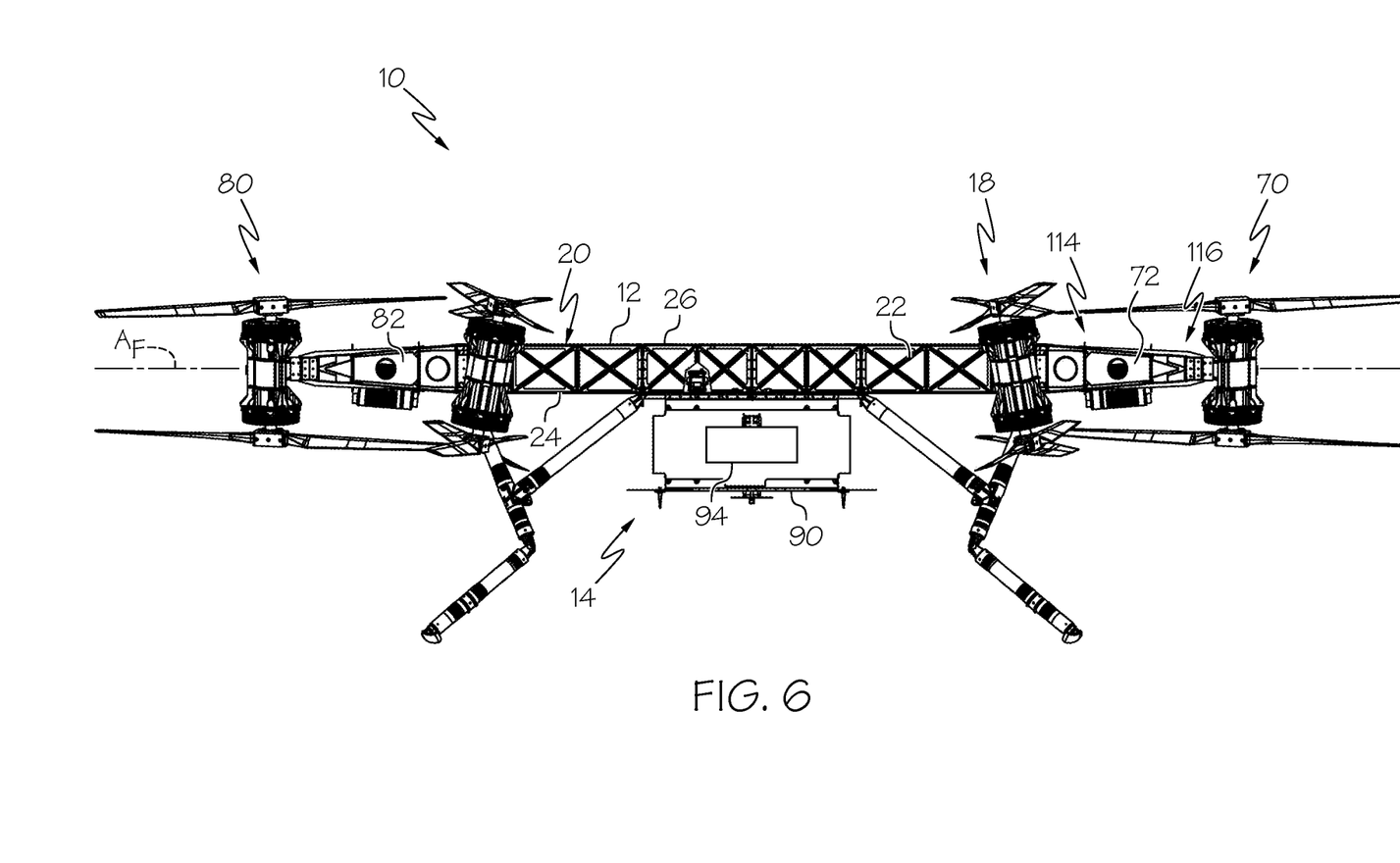
FIG. 6 is a front elevational view of the unmanned aerial vehicle of FIG. 5.

As best shown in FIGS. 5 and 6, the frame 12 of the disclosed unmanned aerial vehicle 10 may include a truss 22 (e.g., a Brown-type truss) and may be elongated along a frame axis $A_F$, which may be orthogonal to (e.g., lateral relative to) the forward direction F the unmanned aerial vehicle 10. Therefore, the frame 12 may have a left end portion 18 and a right end portion 20 that is axially opposed from the left end portion 18 relative to the frame axis $A_F$. The frame 12 may further have a leading side 14 and an aft side 16, as well as an underside 24 and a topside 26.

Still referring to FIGS. 1-6, the first forward rotor assembly 30 of the disclosed unmanned aerial vehicle 10 is connected to the left end portion 18 of the frame 12 on the leading side 14 of the frame 12. For example, the unmanned aerial vehicle 10 may include a first forward boom 32 having a proximal end portion 31 (FIG. 4) connected to the left end portion 18 of the frame 12 and a distal end portion 33 (FIG. 4) connected to the first forward rotor assembly 30.

Figure 1:
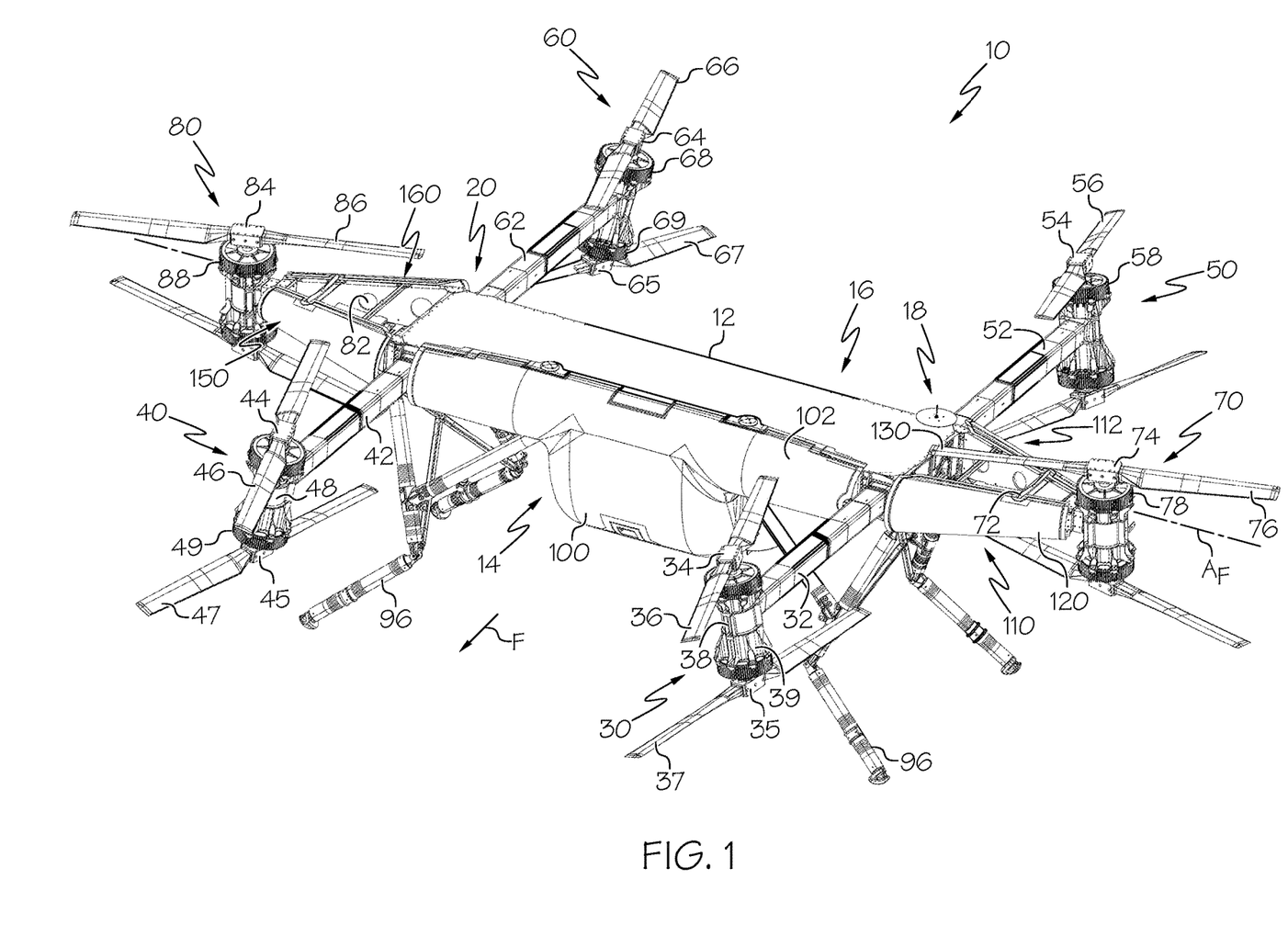
FIG. 1 is a front perspective view of one example of the disclosed unmanned aerial vehicle.
Figure 2:
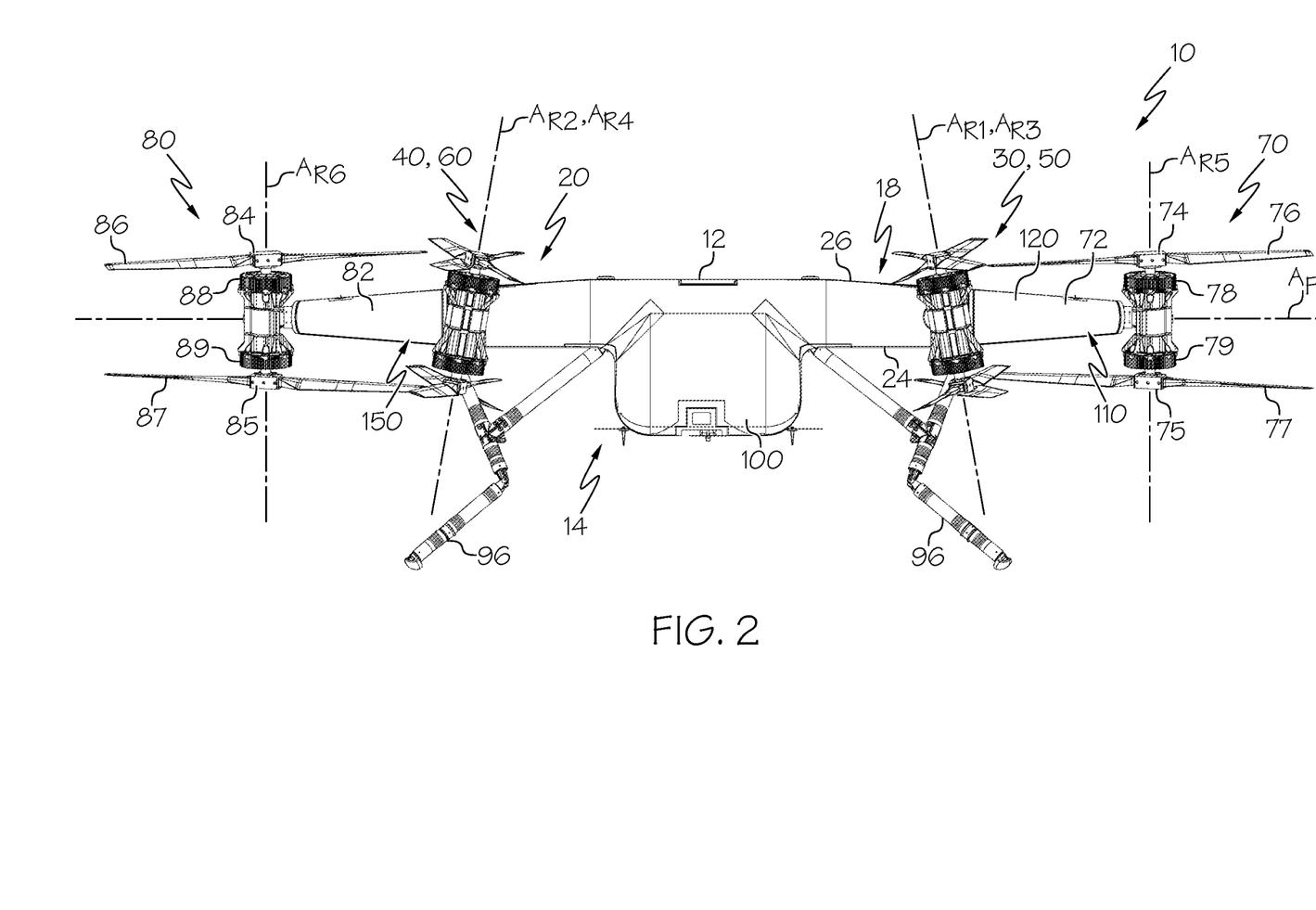
FIG. 2 is a front elevational view of the unmanned aerial vehicle of FIG. 1.
Figure 3:
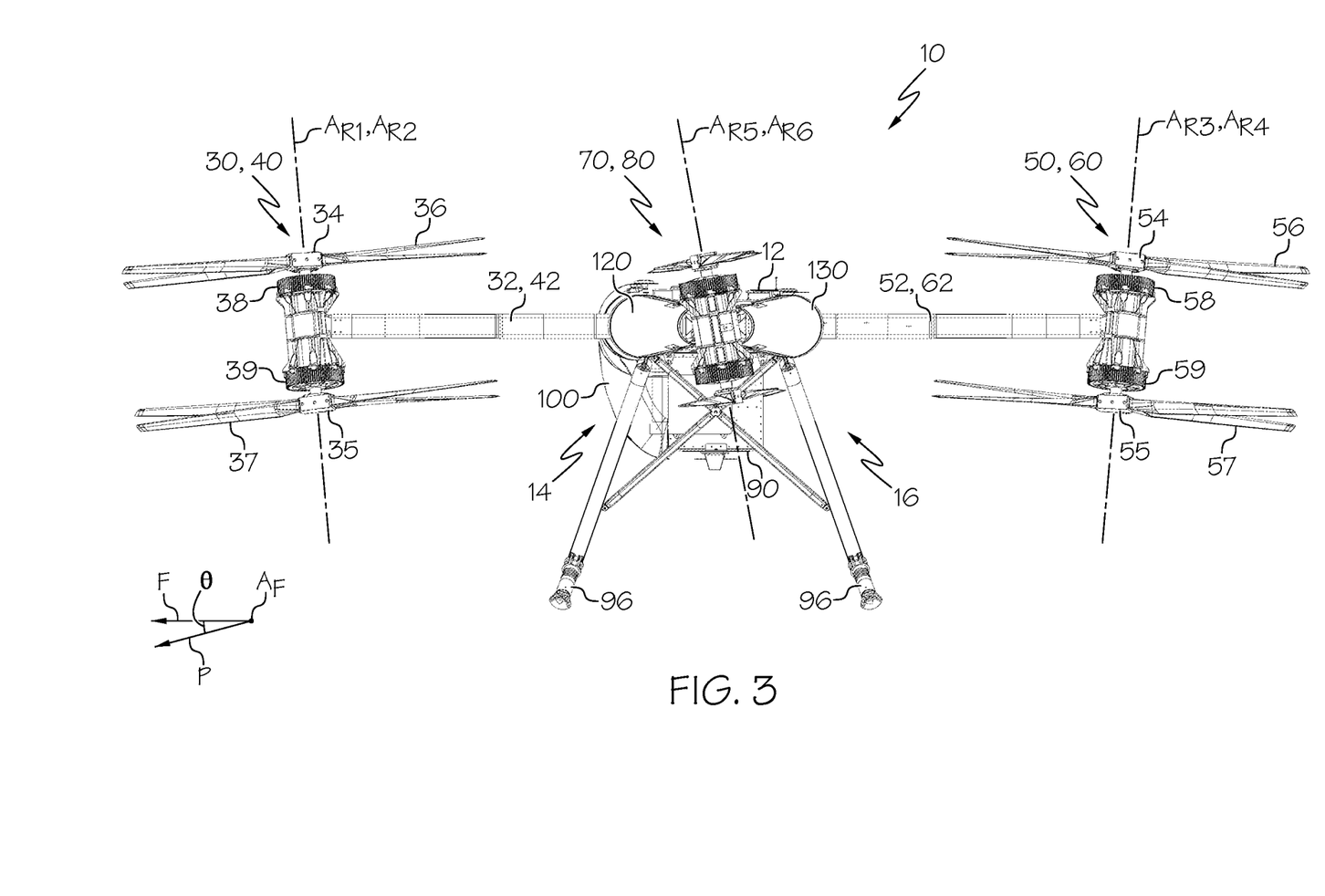
FIG. 3 is a side elevational view of the unmanned aerial vehicle of FIG. 1.
Figure 4:
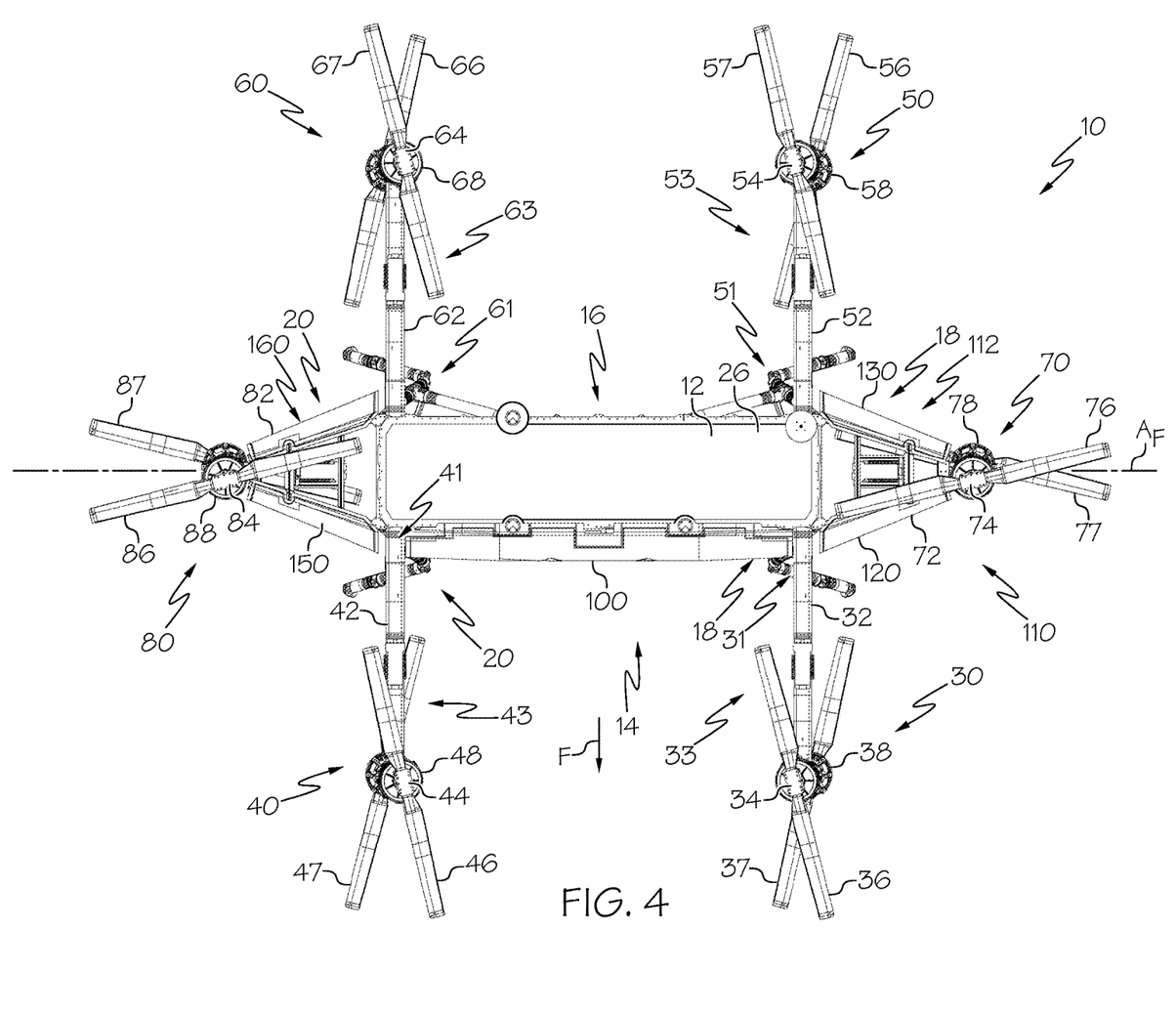
FIG. 4 is a top plan view of the unmanned aerial vehicle of FIG. 1.

The first forward rotor assembly 30 may include a rotor shaft 34, a rotor 36, and a motor 38, as best shown in FIGS. 1-3. The rotor shaft 34 may define a rotor shaft axis $A_{R1}$, which may be slightly tilted inward (i.e., toward the right end portion 20 of the frame 12) and slightly tilted in the forward direction F. The rotor shaft 34 may be rotatable about the rotor shaft $A_{R1}$. The rotor 36 may be fixedly connected to the rotor shaft 34 such that the rotor 36 rotates with the rotor shaft 34. The motor 38 (e.g., a battery-powered electric motor) may be operatively connected to the rotor shaft 34 to cause the rotor shaft 34 and, thus, the rotor 36, to rotate about the rotor shaft axis $A_{R1}$.

In one particular implementation, the first forward rotor assembly 30 may include a pair or rotors 36, 37 (e.g., a pair of co-rotating rotors (same direction)). The second rotor 37 of the first forward rotor assembly 30 may be fixedly connected to a second rotor shaft 35 and may be powered by a second motor 39. The motors 38, 39 of the first forward rotor assembly 30 may be configured as a coaxial motor stack.

The second forward rotor assembly 40 of the disclosed unmanned aerial vehicle 10 may be connected to the right end portion 20 of the frame 12 on the leading side 14 of the frame 12. For example, the unmanned aerial vehicle 10 may include a second forward boom 42 having a proximal end portion 41 (FIG. 4) connected to the right end portion 20 of the frame 12 and a distal end portion 43 (FIG. 4) connected to the second forward rotor assembly 40. Therefore, the unmanned aerial vehicle 10 may have a pair of forward booms 32, 42.

The second forward rotor assembly 40 may include a rotor shaft 44, a rotor 46, and a motor 48. The rotor shaft 44 may define a rotor shaft axis $A_{R2}$, which may be slightly tilted inward (i.e., toward the left end portion 18 of the frame 12) and slightly tilted in the forward direction F. The rotor shaft 44 may be rotatable about the rotor shaft $A_{R2}$. The rotor 46 may be fixedly connected to the rotor shaft 44 such that the rotor 46 rotates with the rotor shaft 44. The motor 48 (e.g., a battery-powered electric motor) may be operatively connected to the rotor shaft 44 to cause the rotor shaft 44 and, thus, the rotor 46, to rotate about the rotor shaft axis $A_{R2}$.

In one particular implementation, the second forward rotor assembly 40 may include a pair or rotors 46, 47 (e.g., a pair of co-rotating rotors (same direction)). The second rotor 47 of the second forward rotor assembly 40 may be fixedly connected to a second rotor shaft 45 and may be powered by a second motor 49. The motors 48, 49 of the second forward rotor assembly 40 may be configured as a coaxial motor stack.

The first aft rotor assembly 50 of the disclosed unmanned aerial vehicle 10 may be connected to the left end portion 18 of the frame 12 on the aft side 16 of the frame 12. For example, the unmanned aerial vehicle 10 may include a first aft boom 52 having a proximal end portion 51 (FIG. 4) connected to the left end portion 18 of the frame 12 and a distal end portion 53 (FIG. 4) connected to the first aft rotor assembly 50.

The first aft rotor assembly 50 may include a rotor shaft 54, a rotor 56, and a motor 58. The rotor shaft 54 may define a rotor shaft axis $A_{R3}$, which may be slightly tilted inward (i.e., toward the right end portion 20 of the frame 12). The rotor shaft 54 may be rotatable about the rotor shaft $A_{R3}$. The rotor 56 may be fixedly connected to the rotor shaft 54 such that the rotor 56 rotates with the rotor shaft 54. The motor 58 (e.g., a battery-powered electric motor) may be operatively connected to the rotor shaft 54 to cause the rotor shaft 54 and, thus, the rotor 56, to rotate about the rotor shaft axis $A_{R3}$.

In one particular implementation, the first aft rotor assembly 50 may include a pair or rotors 56, 57 (e.g., a pair of co-rotating rotors (same direction)). The second rotor 57 of the first aft rotor assembly 50 may be fixedly connected to a second rotor shaft 55 and may be powered by a second motor 59. The motors 58, 59 of the first aft rotor assembly 50 may be configured as a coaxial motor stack.

The second aft rotor assembly 60 of the disclosed unmanned aerial vehicle 10 may be connected to the right end portion 20 of the frame 12 on the aft side 16 of the frame 12. For example, the unmanned aerial vehicle 10 may include a second aft boom 62 having a proximal end portion 61 (FIG. 4) connected to the right end portion 20 of the frame 12 and a distal end portion 63 (FIG. 4) connected to the second aft rotor assembly 60. Therefore, the unmanned aerial vehicle 10 may have a pair of aft booms 52, 62.

The second aft rotor assembly 60 may include a rotor shaft 64, a rotor 66, and a motor 68. The rotor shaft 64 may define a rotor shaft axis $A_{R4}$, which may be slightly tilted inward (i.e., toward the left end portion 18 of the frame 12). The rotor shaft 64 may be rotatable about the rotor shaft $A_{R4}$. The rotor 66 may be fixedly connected to the rotor shaft 64 such that the rotor 66 rotates with the rotor shaft 64. The motor 68 (e.g., a battery-powered electric motor) may be operatively connected to the rotor shaft 64 to cause the rotor shaft 64 and, thus, the rotor 66, to rotate about the rotor shaft axis $A_{R4}$.

In one particular implementation, the second aft rotor assembly 60 may include a pair or rotors 66, 67 (e.g., a pair of co-rotating rotors (same direction)). The second rotor 67 of the second aft rotor assembly 60 may be fixedly connected to a second rotor shaft 65 and may be powered by a second motor 69. The motors 68, 69 of the second aft rotor assembly 60 may be configured as a coaxial motor stack.

The first outboard rotor assembly 70 of the disclosed unmanned aerial vehicle 10 may be connected to the left end portion 18 of the frame 12 and may protrude laterally outward from the frame 12 (e.g., along the frame axis $A_F$). For example, the unmanned aerial vehicle 10 may include a first outboard boom 72 having a leading side 110 and an aft side 112, as well as a proximal end portion 114 and a distal end portion 116 opposed from the proximal end portion 114. The proximal end portion 114 of the first outboard boom 72 may be connected to the left end portion 18 of the frame 12 and the distal end portion 116 of the first outboard boom 72 may be connected to the first outboard rotor assembly 70.

The first outboard rotor assembly 70 may include a rotor shaft 74, a rotor 76, and a motor 78. The rotor shaft 74 may define a rotor shaft axis $A_{R5}$, which may be slightly tilted in the forward direction F. The rotor shaft 74 may be rotatable about the rotor shaft $A_{R5}$. The rotor 76 may be fixedly connected to the rotor shaft 74 such that the rotor 76 rotates with the rotor shaft 74. The motor 78 (e.g., a battery-powered electric motor) may be operatively connected to the rotor shaft 74 to cause the rotor shaft 74 and, thus, the rotor 76, to rotate about the rotor shaft axis $A_{R5}$.

In one particular implementation, the first outboard rotor assembly 70 may include a pair or rotors 76, 77 (e.g., a pair of contra-rotating rotors). The second rotor 77 of the first outboard rotor assembly 70 may be fixedly connected to a second rotor shaft 75 and may be powered by a second motor 79. The motors 78, 79 of the first outboard rotor assembly 70 may be configured as a coaxial motor stack.

The second outboard rotor assembly 80 of the disclosed unmanned aerial vehicle 10 may be connected to the right end portion 20 of the frame 12 and may protrude laterally outward from the frame 12 (e.g., along the frame axis $A_F$). For example, the unmanned aerial vehicle 10 may include a second outboard boom 82 having a leading side 140 and an aft side 142, as well as a proximal end portion 144 and a distal end portion 146 opposed from the proximal end portion 144. The proximal end portion 144 of the second outboard boom 82 may be connected to the right end portion 20 of the frame 12 and the distal end portion 146 of the second outboard boom 82 may be connected to the second outboard rotor assembly 80. Therefore, the unmanned aerial vehicle 10 may have a pair of outboard booms 72, 82.

The second outboard rotor assembly 80 may include a rotor shaft 84, a rotor 86, and a motor 88. The rotor shaft 84 may define a rotor shaft axis $A_{R6}$, which may be slightly tilted in the forward direction F. The rotor shaft 84 may be rotatable about the rotor shaft $A_{R6}$. The rotor 86 may be fixedly connected to the rotor shaft 84 such that the rotor 86 rotates with the rotor shaft 84. The motor 88 (e.g., a battery-powered electric motor) may be operatively connected to the rotor shaft 84 to cause the rotor shaft 84 and, thus, the rotor 86, to rotate about the rotor shaft axis $A_{R6}$.

In one particular implementation, the second outboard rotor assembly 80 may include a pair or rotors 86, 87 (e.g., a pair of contra-rotating rotors). The second rotor 87 of the second outboard rotor assembly 80 may be fixedly connected to a second rotor shaft 85 and may be powered by a second motor 89. The motors 88, 89 of the second outboard rotor assembly 80 may be configured as a coaxial motor stack.

The compartment 90 of the disclosed unmanned aerial vehicle 10 has a leading side 92 and an aft side opposed from the leading side 92, and is connected to the frame 12. As one example, the compartment 90 may be connected to the underside 24 of the frame 12, as shown in FIGS. 5 and 6. As another example, the compartment 90 may be connected to the topside 26 of the frame 12.

The compartment 90 may define a partially enclosed or a fully enclosed space for storing various items on the unmanned aerial vehicle 10. As one example, the compartment 90 may be a battery compartment, and a battery 94 may be received (e.g., housed) in the compartment 90. The battery 94 may be used to power the various motors 38, 39, 48, 49, 58, 59, 68, 68, 78, 79, 88, 89 of the unmanned aerial vehicle 10. As another example, the compartment 90 may be a payload compartment. As yet another example, the compartment 90 may be configured for receiving both a battery 94 and a payload (not shown).

The unmanned aerial vehicle 10 may further include landing gear 96. The landing gear 96 may be connected to the frame 12, such as to the underside 24 of the frame 12. With the landing gear 96 positioned on the underside 24 of the frame 12, the landing gear 96 may elevate the frame 12 above any structure (e.g., landing pad (not shown)) upon which the unmanned aerial vehicle 10 is resting.

The curved leading-edge fairing 100 of the disclosed unmanned aerial vehicle 10 is positioned over at least a portion of the leading side 14 of the frame 12 and at least a portion of the leading side 92 of the compartment 90. In one particular construction, the curved leading-edge fairing 100 substantially completely covers (e.g., covers at least 90 percent of) the leading side 14 of the frame 12 and the leading side 92 of the compartment 90. For example, the curved leading-edge fairing 100 may be disposed relative to the frame 12 such that a first portion 101 of the curved leading-edge fairing 100 extends over the leading side 14 of the frame 12 and a second portion 103 extends over the leading side 92 of the compartment 90.

Figure 7:
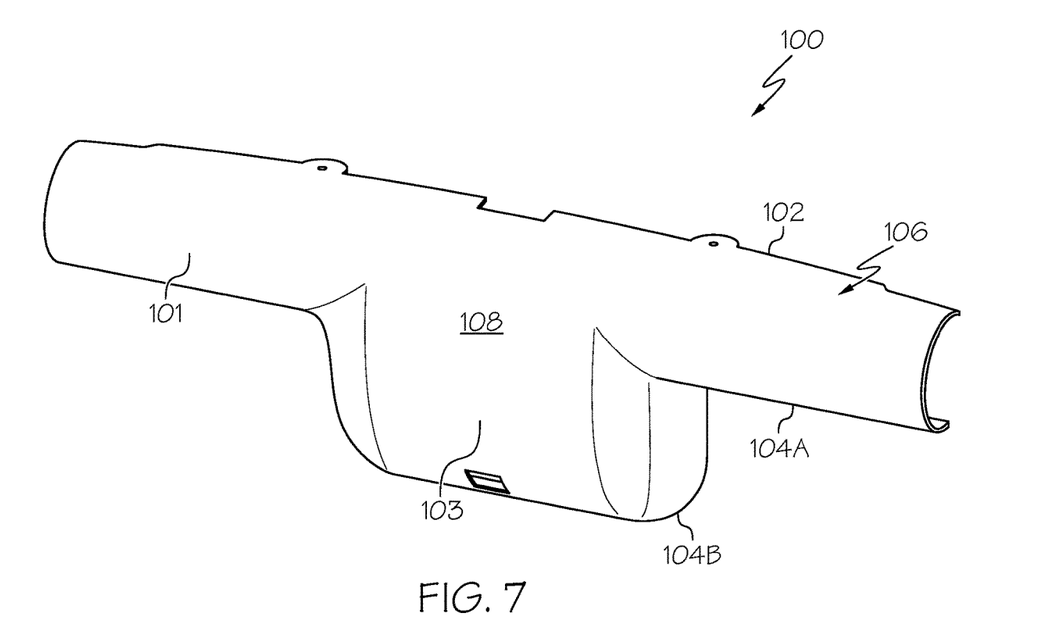
FIG. 7 is a front perspective view of the curved leading-edge fairing of the unmanned aerial vehicle of FIG. 1.

As shown in FIG. 7, the curved leading-edge fairing 100 may include an upper edge 102, a lower edge 104A associated with the first portion 101 of the curved leading-edge fairing 100, and a lower edge 104B associated with the second portion 103 of the curved leading-edge fairing 100, and may have a continuous curvature 106 from the upper edge 102 to the lower edge 104A and a continuous curvature 106 from the upper edge 102 to the lower edge 104B. For example, from the upper edge 102 to the lower edge 104A, the curved leading-edge fairing 100 has a minimum radius of curvature of at least about 3 inches. Therefore, the curved leading-edge fairing 100 may have an aerodynamic shape that reduces drag during flight of the unmanned aerial vehicle 10 in a forward direction F (FIG. 1) to enable a substantially level flight profile. Within examples, the substantially level flight profile is a pitch angle Θ of the frame 12 about the frame axis $A_F$, during flight in a forward direction F, of 0 degrees up to about 13 degrees, and more preferably a pitch angle Θ of 0 to about 10 degrees.

The curved leading-edge fairing 100 may be constructed from various materials without departing from the scope of the present disclosure. Appropriate material selection may ensure that the outer surface 108 of the curved leading-edge fairing 100 is sufficiently smooth and aerodynamic. Examples of suitable materials include, without limitation, metals and metal alloys (e.g., titanium alloys), polymeric materials, and composite materials (e.g., carbon fiber-reinforced epoxy composites).

The first forward boom fairing 120 of the disclosed unmanned aerial vehicle 10 is positioned over at least a portion of the leading side 110 of the first outboard boom 72. In one particular construction, the first forward boom fairing 120 substantially completely covers the leading side 110 of the first outboard boom 72.

Figure 8:
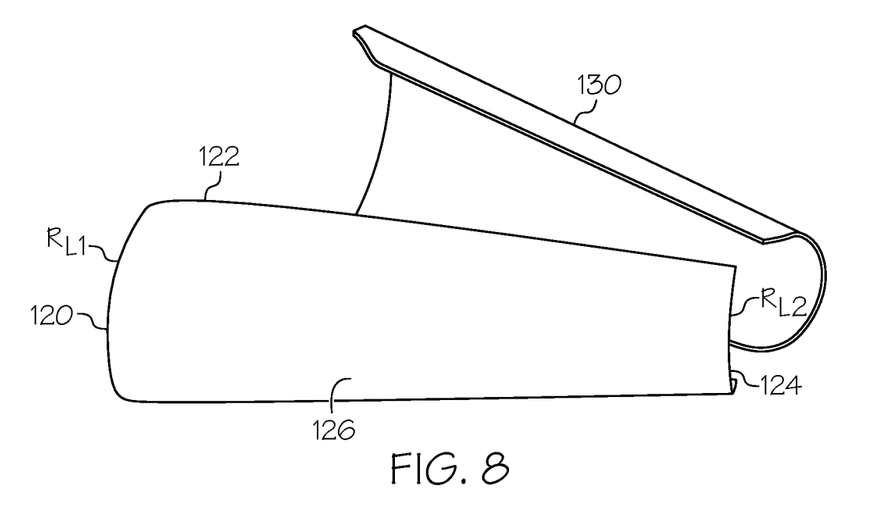
FIGS. 8 and 9 are front perspective view of the boom fairings of the unmanned aerial vehicle of FIG. 1.

As shown in FIG. 8, the first forward boom fairing 120 may include an upper edge 122 and a lower edge 124, and may have a continuous curvature 126 from the upper edge 122 to the lower edge 124. In one particular construction, the first forward boom fairing 120 may have a first radius of curvature $R_{L1}$ proximate (i.e., at or near) the proximal end portion 114 (FIG. 6) of the first outboard boom 72 and a second radius of curvature $R_{L2}$ proximate the distal end portion 116 (FIG. 6) of the first outboard boom 72, and wherein the first radius of curvature $R_{L1}$ is substantially greater (e.g., at least 20 percent greater, such as at least 50 percent greater) than the second radius of curvature $R_{L2}$. For example, the first radius of curvature $R_{L1}$ may be about 5.75 inches and the second radius of curvature $R_{L2}$ may be about 3 inches. Therefore, the first forward boom fairing 120 may have an aerodynamic shape that reduces drag during flight of the unmanned aerial vehicle 10 in a forward direction F (FIG. 1) to enable a substantially level flight profile.

The second forward boom fairing 150 of the disclosed unmanned aerial vehicle 10 is positioned over at least a portion of the leading side 140 of the second outboard boom 82. In one particular construction, the second forward boom fairing 150 substantially completely covers the leading side 140 of the second outboard boom 82.

Figure 9:
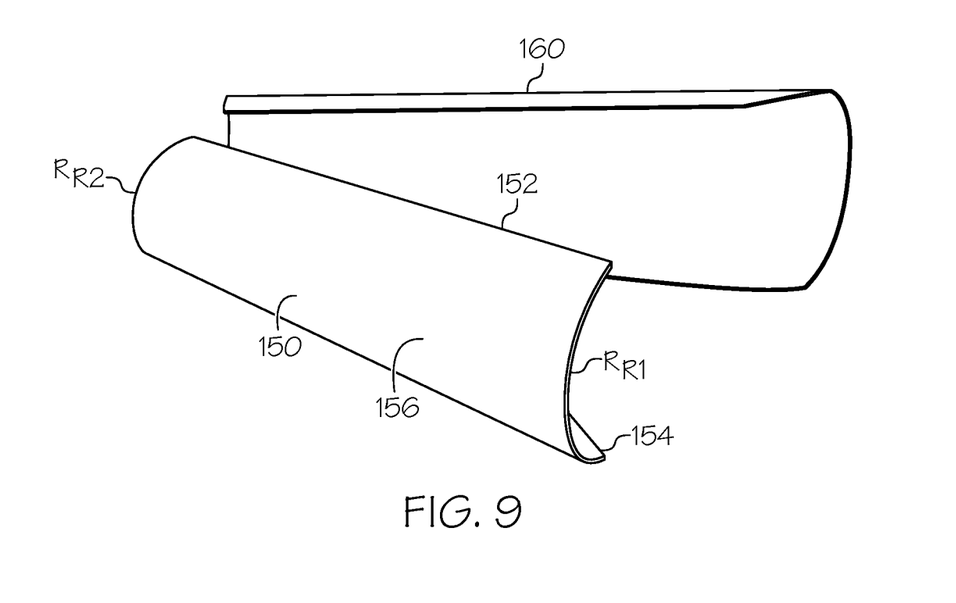

As shown in FIG. 9, the second forward boom fairing 150 may include an upper edge 152 and a lower edge 154, and may have a continuous curvature 156 from the upper edge 152 to the lower edge 154. In one particular construction, the second forward boom fairing 150 may have a first radius of curvature $R_{R1}$ proximate (i.e., at or near) the proximal end portion 144 (FIG. 6) of the second forward boom fairing 150 and a second radius of curvature $R_{R2}$ proximate the distal end portion 146 (FIG. 6) of the second forward boom fairing 150, and wherein the first radius of curvature $R_{R1}$ is substantially greater (e.g., at least 20 percent greater, such as at least 50 percent greater) than the second radius of curvature $R_{R2}$. For example, the first radius of curvature $R_{R1}$ may be about 5.75 inches and the second radius of curvature $R_{R2}$ may be about 3 inches. Therefore, the second forward boom fairing 150 may have an aerodynamic shape that reduces drag during flight of the unmanned aerial vehicle 10 in a forward direction F (FIG. 1) to enable a substantially level flight profile.

The first aft boom fairing 130 of the disclosed unmanned aerial vehicle 10 is positioned over at least a portion of the aft side 112 of the first outboard boom 72. The first aft boom fairing 130 may be sized, shaped and configured in a manner similar to the first forward boom fairing 120 on the forward side 110 of the first outboard boom 72.

The second aft boom fairing 160 of the disclosed unmanned aerial vehicle 10 is positioned over at least a portion of the aft side 142 of the second outboard boom 82. The second aft boom fairing 160 may be sized, shaped and configured in a manner similar to the second forward boom fairing 150 on the forward side 140 of the second outboard boom 82.

The first aft boom fairing 130 and the second aft boom fairing 160 may facilitate drag reduction. Additionally, the first aft boom fairing 130 and the second aft boom fairing 160 may enhance handling qualities in hover. For example, the first forward boom fairing 120 and the second forward boom fairing 150 may be identical to but opposite of the first aft boom fairing 130 and the second aft boom fairing 160. Therefore, in hover, the first forward boom fairing 120, the second forward boom fairing 150, the first aft boom fairing 130, and the second aft boom fairing 160 may passively have equal and opposite forces in the horizontal direction, helping the flight control system to hold position above a point on the ground.

The presence on the unmanned aerial vehicle 10 of the curved leading-edge fairing 100, the first forward boom fairing 120, the second forward boom fairing 150, the first aft boom fairing 130, and/or the second aft boom fairing 160 may significantly reduce drag when the unmanned aerial vehicle 10 moves in a forward direction F, thereby reducing power consumption (e.g., up to about 20 percent) and increasing service duration of the unmanned aerial vehicle 10. Therefore, the pitch angle Θ (i.e., the angle between the forward direction F and the pitch attitude P of the frame 12 about the frame axis $A_F$) of the unmanned aerial vehicle 10 during flight in the forward direction F can be significantly reduced (e.g., a predetermined reduction in pitch angle Θ can be achieved). Within examples, the predetermined reduction in pitch angle Θ is a reduction (compared to a pitch angle of a UAV configured without the presence of the disclosed fairings) in pitch angle Θ of about 2 to 5 degrees. For example, a reduction in pitch angle Θ of up to about 5 degrees may be achieved, such as a 4 degree reduction in pitch angle Θ or a 3 degree reduction in pitch angle Θ or a 2 degree reduction in pitch angle Θ. The reduced drag enables the predetermined reduction in the pitch angle Θ that is effective to yield a reduced pitch angle Θ of the frame 12 about the frame axis $A_F$ that is at most 13 degrees. Within examples, the reduced pitch angle Θ is between about 10 and 13 degrees.

In one expression, the pitch angle Θ of the frame 12 about the frame axis $A_F$ is at most about 13 degrees when the unmanned aerial vehicle 10 is traveling in a forward direction F at airspeeds up to about 50 knots. In another expression, the pitch angle Θ of the frame 12 about the frame axis $A_F$ is at most about 12 degrees when the unmanned aerial vehicle 10 is traveling in a forward direction F at airspeeds up to about 50 knots. In another expression, the pitch angle Θ of the frame 12 about the frame axis $A_F$ is at most about 11 degrees when the unmanned aerial vehicle 10 is traveling in a forward direction F at airspeeds up to about 50 knots. In another expression, the pitch angle Θ of the frame 12 about the frame axis $A_F$ is at most about 10 degrees when the unmanned aerial vehicle 10 is traveling in a forward direction F at airspeeds up to about 50 knots.

As mentioned above, the presence on the unmanned aerial vehicle 10 of the curved leading-edge fairing 100, the first forward boom fairing 120, the second forward boom fairing 150, the first aft boom fairing 130, and the second aft boom fairing 160 helps to reduce power consumption and increase service duration of the unmanned aerial vehicle 10. Furthermore, the presence on the unmanned aerial vehicle 10 of the curved leading-edge fairing 100, the first forward boom fairing 120, the second forward boom fairing 150, the first aft boom fairing 130, and the second aft boom fairing 160 may significantly reduce noise when the unmanned aerial vehicle 10 moves in a forward direction F. Without being limited to any particular theory, it is presently believed that the presence of the curved leading-edge fairing 100, the first forward boom fairing 120, the second forward boom fairing 150, the first aft boom fairing 130, and the second aft boom fairing 160 enhances the stability (e.g., closer to neutral stability) of the unmanned aerial vehicle 10, thereby contributing to UAV/rotor noise reduction.

Also disclosed are methods for reducing drag during flight of an unmanned aerial vehicle that includes a frame elongated along a frame axis, the frame comprising a leading side and an aft side, the frame further comprising a left end portion and a right end portion, at least two rotor assemblies connected to the left end portion of the frame by way of at least two first booms, and at least two rotor assemblies connected to the right end portion of the frame by way of at least two second booms.

Figure 10:
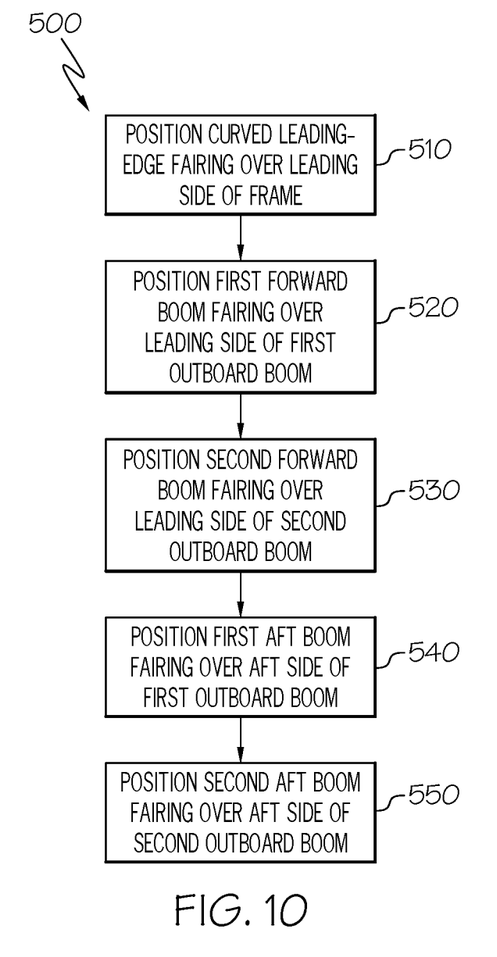
FIG. 10 is a flow diagram depicting one example of the disclosed method for reducing drag during flight of an unmanned aerial vehicle.

Referring to FIG. 10, one example of the disclosed method for reducing drag during flight of an unmanned aerial vehicle, generally designated 500, begins at Block 510 with the step of positioning a curved leading-edge fairing 100 over at least a portion of the leading side 14 of the frame 12. At Block 520, a first forward boom fairing 120 is positioned over the first outboard boom 72. At Block 530, a second forward boom fairing 150 is positioned over the second outboard boom 82. At Block 540, a first aft boom fairing 130 may be positioned over the first outboard boom 72. At block 550, a second aft boom fairing 160 may be positioned over the second outboard boom 82.

Figure 11:
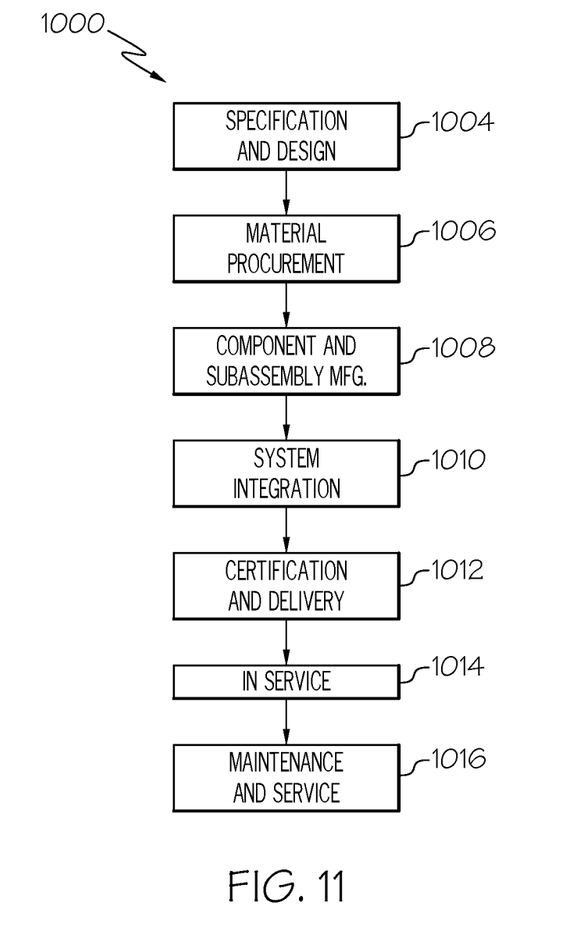
FIG. 11 is a flow diagram of an aircraft manufacturing and service methodology.
Figure 12:
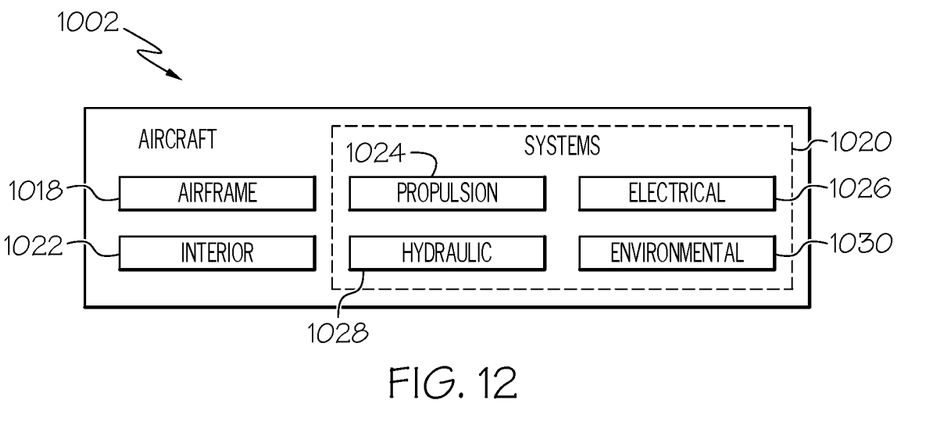
FIG. 12 is a block diagram of an aircraft.

Examples of the disclosure may be described in the context of an aircraft manufacturing and service method 1000, as shown in FIG. 11, and an aircraft 1002, as shown in FIG. 12. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed unmanned aerial vehicle and/or method for reducing drag during flight of an unmanned aerial vehicle may be employed during any one or more of the stages of the aircraft manufacturing and service method 1000. As one example, the disclosed unmanned aerial vehicle and/or method for reducing drag during flight of an unmanned aerial vehicle may be employed during material procurement 1006. As another example, components or subassemblies corresponding to component/subassembly manufacturing 1008, system integration 1010, and or maintenance and service 1016 may be fabricated or manufactured using the disclosed unmanned aerial vehicle and/or method for reducing drag during flight of an unmanned aerial vehicle. As another example, the airframe 1018 and the interior 1022 may be constructed using the disclosed unmanned aerial vehicle and/or method for reducing drag during flight of an unmanned aerial vehicle. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The disclosed unmanned aerial vehicle and/or method for reducing drag during flight of an unmanned aerial vehicle are described in the context of an aircraft; however, one of ordinary skill in the art will readily recognize that the disclosed unmanned aerial vehicle and/or method for reducing drag during flight of an unmanned aerial vehicle may be utilized for a variety of applications. For example, the disclosed unmanned aerial vehicle and/or method for reducing drag during flight of an unmanned aerial vehicle may be implemented in various types of vehicles, including, for example, helicopters, passenger ships, automobiles and the like.

Although various examples of the disclosed unmanned aerial vehicle and/or method for reducing drag during flight of an unmanned aerial vehicle have been shown and described, modifications may occur to those skilled in the art upon reading the specification. The present application includes such modifications and is limited only by the scope of the claims.

What is claimed is:

1. An unmanned aerial vehicle comprising:
a frame elongated along a frame axis, the frame comprising a leading side and an aft side, the frame further comprising a left end portion and a right end portion, the frame further comprising an underside and a topside;
a first forward rotor assembly connected to the left end portion of the frame;
a second forward rotor assembly connected to the right end portion of the frame, the first forward rotor assembly and the second forward rotor assembly being positioned on the leading side of the frame;
a pair of outboard rotor assemblies disposed on a pair of outboard booms;
a pair of forward boom fairings disposed on the pair of outboard booms;
a compartment connected to the underside of the frame and at least partially enclosing a space, the compartment comprising a leading side; and
a curved leading-edge fairing disposed on the frame, wherein a portion of the curved leading-edge fairing extends to cover the leading side of the compartment, and wherein the curved leading-edge fairing reduces drag during flight in a forward direction to enable a substantially level flight profile.

2. The unmanned aerial vehicle of claim 1 wherein the curved leading-edge fairing comprises an upper edge, a lower edge, and a continuous curvature from the upper edge to the lower edge.

3. The unmanned aerial vehicle of claim 1 wherein the curved leading-edge fairing substantially completely covers the leading side of the frame and the leading side of the compartment.

4. The unmanned aerial vehicle of claim 1 wherein a pitch angle of the frame about the frame axis is less than 13 degrees when the unmanned aerial vehicle is traveling in a forward direction at airspeeds up to about 50 knots.

5. The unmanned aerial vehicle of claim 1 wherein a pitch angle of the frame about the frame axis is at most about 10 degrees when the unmanned aerial vehicle is traveling in a forward direction at airspeeds up to about 50 knots.

6. The unmanned aerial vehicle of claim 1 wherein the curved leading-edge fairing and the pair of forward boom fairings reduce drag during flight in the forward direction to enable a predetermined reduction in a pitch angle of the frame about the frame axis when the unmanned aerial vehicle moves in the forward direction.

7. The unmanned aerial vehicle of claim 1 wherein:
the pair of outboard booms comprises a first outboard boom comprising a leading side and an aft side, the first outboard boom further comprising a proximal end portion and a distal end portion opposed from the proximal end portion, the proximal end portion of the first outboard boom being connected to the left end portion of the frame;
the pair of outboard rotor assemblies comprises a first outboard rotor assembly connected to the distal end portion of the first outboard boom; and
the pair of forward boom fairings comprises a first forward boom fairing positioned over at least a portion of the leading side of the first outboard boom.

8. The unmanned aerial vehicle of claim 7 wherein the first forward boom fairing comprises a first radius of curvature proximate the proximal end portion of the first outboard boom and a second radius of curvature proximate the distal end portion of the first outboard boom, and wherein the first radius of curvature is substantially greater than the second radius of curvature.

9. The unmanned aerial vehicle of claim 7 wherein:
the pair of outboard booms further comprises a second outboard boom comprising a leading side and an aft side, the second outboard boom further comprising a proximal end portion and a distal end portion opposed from the proximal end portion, the proximal end portion of the second outboard boom being connected to the right end portion of the frame;
the pair of outboard rotor assemblies further comprises a second outboard rotor assembly connected to the distal end portion of the second outboard boom; and
the pair of forward boom fairings further comprises a second forward boom fairing positioned over at least a portion of the leading side of the second outboard boom.

10. The unmanned aerial vehicle of claim 9 wherein the second forward boom fairing comprises a first radius of curvature proximate the proximal end portion of the second outboard boom and a second radius of curvature proximate the distal end portion of the second outboard boom, and wherein the first radius of curvature is substantially greater than the second radius of curvature.

11. The unmanned aerial vehicle of claim 9 further comprising a pair of aft boom fairings disposed on the pair of outboard booms, wherein the pair of aft boom fairings comprises a first aft boom fairing positioned over at least a portion of the aft side of the first outboard boom and a second aft boom fairing positioned over at least a portion of the aft side of the second outboard boom.

12. The unmanned aerial vehicle of claim 1 further comprising:
a pair of aft boom fairings disposed on the pair of outboard booms.

13. The unmanned aerial vehicle of claim 1 further comprising:
a first aft rotor assembly connected to the left end portion of the frame; and
a second aft rotor assembly connected to the right end portion of the frame, the first aft rotor assembly and the second aft rotor assembly being positioned on the aft side of the frame.

14. The unmanned aerial vehicle of claim 13 further comprising:
a first aft boom connecting the first aft rotor assembly to the left end portion of the frame; and
a second aft boom connecting the second aft rotor assembly to the right end portion of the frame.

15. The unmanned aerial vehicle of claim 13 wherein each of the first aft rotor assembly and the second aft rotor assembly comprises:
a rotor shaft defining a rotor shaft axis;
a rotor connected to the rotor shaft; and
a motor operatively connected to the rotor shaft to cause the rotor shaft to rotate about the rotor shaft axis.

16. The unmanned aerial vehicle of claim 1 wherein the compartment is positioned on the underside of the frame.

17. An unmanned aerial vehicle comprising:
a frame elongated along a frame axis, the frame comprising a leading side and an aft side, the frame further comprising a left end portion and a right end portion axially opposed from the left end portion relative to the frame axis;
a first forward rotor assembly connected to the left end portion of the frame by way of a first forward boom;
a first aft rotor assembly connected to the left end portion of the frame by way of a first aft boom;
a first outboard rotor assembly connected to the left end portion of the frame by way of a first outboard boom, the first outboard boom comprising a leading side and an aft side;
a first forward boom fairing positioned over the leading side of the first outboard boom;
a second forward rotor assembly connected to the right end portion of the frame by way of a second forward boom;
a second aft rotor assembly connected to the right end portion of the frame by way of a second aft boom;
a second outboard rotor assembly connected to the right end portion of the frame by way of a second outboard boom, the second outboard boom comprising a leading side and an aft side;
a second forward boom fairing positioned over the leading side of the second outboard boom;
a compartment connected to the frame, the compartment comprising a leading side; and a curved leading-edge fairing disposed on the frame, wherein a portion of the curved leading-edge fairing extends to cover the leading side of the compartment.

18. A method for reducing drag during flight of an unmanned aerial vehicle comprising a frame elongated along a frame axis, the frame comprising a leading side and an aft side, the frame further comprising a left end portion and a right end portion, the frame further comprising an underside and a topside, at least three rotor assemblies connected to the left end portion of the frame by way of a plurality of first booms, the at least three rotor assemblies connected to the left end portion comprising a first outboard rotor assembly, the plurality of first booms comprising a first outboard boom, the first outboard rotor assembly connected to the left end portion of the frame by way of the first outboard boom, at least three rotor assemblies connected to the right end portion of the frame by way of a plurality of second booms, the at least three rotor assemblies connected to the right end portion comprising a second outboard rotor assembly, the plurality of second booms comprising a second outboard boom, the second outboard rotor assembly connected to the right end portion of the frame by way of the second outboard boom and a compartment connected to the underside of the frame and at least partially enclosing a space, the compartment comprising a leading side, the method comprising:
    positioning a curved leading-edge fairing over at least a portion of the leading side of the frame, wherein a portion of the curved leading-edge fairing extends to cover the leading side of the compartment;
    positioning a first forward boom fairing over a leading side of the first outboard boom; and
    positioning a second forward boom fairing over a leading side of the second outboard boom.

19. The method of claim 18 wherein the compartment is positioned on the underside of the frame.

\* \* \* \* \*